(12) United States Patent
Heyns et al.

(10) Patent No.: US 10,390,485 B2
(45) Date of Patent: Aug. 27, 2019

(54) AGRICULTURAL FEEDER ASSEMBLY WITH A SHIELDED SPROCKET

(71) Applicant: CNH Industrial America LLC, New Holland, PA (US)

(72) Inventors: Jolan Heyns, Oostkamp (BE); Gert J. A. Mattheeuws, Beernem (BE)

(73) Assignee: CNH Industrial America LLC, New Holland, PA (US)

( * ) Notice: Subject to any disclaimer, the term of this patent is extended or adjusted under 35 U.S.C. 154(b) by 228 days.

(21) Appl. No.: 15/458,652

(22) Filed: Mar. 14, 2017

(65) Prior Publication Data

US 2017/0258009 A1    Sep. 14, 2017

(30) Foreign Application Priority Data

Mar. 14, 2016  (BE) .................................. 2016/5184

(51) Int. Cl.
| | | |
|---|---|---|
| *A01D 61/02* | (2006.01) |
| *A01F 12/46* | (2006.01) |
| *A01D 61/04* | (2006.01) |
| *A01F 12/44* | (2006.01) |
| *A01F 12/10* | (2006.01) |
| *A01D 61/00* | (2006.01) |
| *A01D 57/02* | (2006.01) |
| *A01D 41/06* | (2006.01) |
| *A01D 34/04* | (2006.01) |
| *A01F 7/06* | (2006.01) |
| *A01B 71/08* | (2006.01) |

(Continued)

(52) U.S. Cl.
CPC ............ *A01D 61/008* (2013.01); *A01B 71/08* (2013.01); *A01D 34/04* (2013.01); *A01D 41/06* (2013.01); *A01D 57/02* (2013.01); *A01D 61/02* (2013.01); *A01D 61/04* (2013.01); *A01F 7/062* (2013.01); *A01F 12/10* (2013.01); *A01F 12/444* (2013.01); *A01F 12/446* (2013.01); *A01F 12/46* (2013.01); *A01D 69/00* (2013.01)

(58) Field of Classification Search
CPC ...... A01D 61/008; A01D 61/02; A01D 61/04; A01F 12/46
USPC .................................................. 474/165, 144
See application file for complete search history.

(56) References Cited

U.S. PATENT DOCUMENTS 3,779,251 A * 12/1973  Rowland-Hill ........ A01D 41/12
                                                   460/106
3,785,472 A    1/1974  Mathews
(Continued)

FOREIGN PATENT DOCUMENTS

CN      201957468 U     9/2011
CN      202232199 U     5/2012
(Continued)

*Primary Examiner* — Michael R Mansen
*Assistant Examiner* — Mark K Buse
(74) *Attorney, Agent, or Firm* — Peter K. Zacharias; Patrick M. Sheldrake

(57) ABSTRACT

An assembly for rotating a chain or toothed belt includes a shaft and a sprocket rotatably mounted on the shaft. The sprocket includes a plurality of teeth configured to engage the chain or toothed belt. The assembly further includes a shield assembly covering at least a portion of the sprocket. The shield assembly has an interior groove formed therein defining an enclosed interior space. Each of the teeth of the sprocket rotate through the enclosed interior space during a full rotation of the sprocket.

15 Claims, 4 Drawing Sheets

(51) Int. Cl.
*A01D 69/00* (2006.01)
*A01B 1/08* (2006.01)

(56) References Cited

U.S. PATENT DOCUMENTS

| | | | | |
|---|---|---|---|---|
| 3,815,439 A * | 6/1974 | Tarutani | ............... | B62M 9/10 |
| | | | | 474/144 |
| 3,825,138 A * | 7/1974 | Pool | ............... | A01D 41/1217 |
| | | | | 198/586 |
| 3,885,471 A * | 5/1975 | Morine | ............... | F16P 1/02 |
| | | | | 474/144 |
| 3,913,985 A * | 10/1975 | Orr | ............... | B62D 55/0845 |
| | | | | 180/9.62 |
| 4,044,621 A * | 8/1977 | McGregor, Sr. | ......... | B62J 13/00 |
| | | | | 474/144 |
| 4,054,063 A * | 10/1977 | Perrin | ............... | B62J 13/00 |
| | | | | 474/147 |
| 4,240,303 A * | 12/1980 | Mosley | ............... | B62M 9/00 |
| | | | | 474/144 |
| 4,674,762 A * | 6/1987 | Nelson | ............... | B62M 1/00 |
| | | | | 267/273 |
| 4,852,723 A * | 8/1989 | Ellens | ............... | B65G 21/08 |
| | | | | 198/860.5 |
| 5,312,303 A * | 5/1994 | Hinschlager | ............ | B62J 13/04 |
| | | | | 474/144 |
| 5,976,013 A | 11/1999 | Hamann | | |
| 6,105,700 A * | 8/2000 | Williams | ............... | B62J 23/00 |
| | | | | 180/219 |
| 6,231,136 B1 * | 5/2001 | Freeman | ............... | B62D 25/16 |
| | | | | 305/107 |
| 6,293,631 B1 * | 9/2001 | Freeman | ............... | B62D 25/16 |
| | | | | 301/107 |
| 6,715,274 B2 * | 4/2004 | Peeters | ............... | A01D 57/20 |
| | | | | 56/366 |
| 6,959,803 B1 * | 11/2005 | Layne | ............... | B65G 17/08 |
| | | | | 198/600 |
| D540,256 S * | 4/2007 | Bullock, Jr. | ............... | D13/118 |
| 7,544,154 B2 * | 6/2009 | Corbalis | ............ | A63B 22/0605 |
| | | | | 474/144 |
| 7,797,951 B1 * | 9/2010 | Patterson | ............... | A23B 4/06 |
| | | | | 62/373 |
| 7,946,661 B1 | 5/2011 | Freeman | | |
| 8,790,200 B2 * | 7/2014 | Boissonneault | ......... | F16P 1/02 |
| | | | | 474/146 |
| 2004/0023739 A1 | 2/2004 | Linder | | |
| 2004/0128967 A1 | 7/2004 | Vandewalle et al. | | |
| 2012/0048687 A1 | 3/2012 | Boyd et al. | | |
| 2013/0190119 A1 * | 7/2013 | Barnes | ............... | E06B 9/42 |
| | | | | 474/144 |

FOREIGN PATENT DOCUMENTS

| | | |
|---|---|---|
| CN | 203912598 U | 11/2014 |
| DE | 9205617 U1 | 7/1992 |
| DE | 4132246 A1 | 4/1993 |
| EP | 2721917 A1 | 4/2014 |
| GB | 1067125 A | 5/1967 |
| GB | 1067814 A | 5/1967 |
| GB | 1112199 A | 5/1968 |

\* cited by examiner

AGRICULTURAL FEEDER ASSEMBLY WITH A SHIELDED SPROCKET

CROSS REFERENCE TO RELATED APPLICATION

This application claims priority to Belgium Application No. 2016/5184 filed Mar. 14, 2016, the contents of which are incorporated herein by reference.

BACKGROUND OF THE INVENTION

The present invention relates to chain rotating assemblies, and, more specifically to chain rotating assemblies for agricultural feeders.

An agricultural harvester known as a "combine" is historically termed such because it combines multiple harvesting functions with a single harvesting unit, such as picking, threshing, separating and cleaning. A combine includes a header which removes the crop from a field, and a feeder which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi-trailer, gravity box, straight truck or the like by an unloading system on the combine that is actuated to transfer grain into the vehicle.

Agricultural feeders can include a chain engaged with teeth of a sprocket mounted on a rotating shaft. As the shaft rotates, the sprocket also rotates and the teeth of the sprocket engaged with the chain cause rotation of the chain. The chain can engage the teeth of two sprockets to form an endless chain between the two sprockets, with the portion of the chain between the two sprockets moving in a linear, rather than rotational, direction. Paddles or other types of conveying elements can be driven by the chain and contact crop material to convey the crop material in the linear direction before rotating about the sprockets at each end of the endless chain to switch linear direction movement. This allows rotational movement of the shaft to continuously drive the chain and connected conveying elements to linearly move crop material across the feeder.

One particular problem with current constructions is that fed material or debris can become wrapped, impacted or accumulated on the sprockets or shaft rotating the sprockets, as well as under the chain. Material that accumulates on the shaft and/or sprocket can cause friction, requiring more power to rotate the shaft. Further, when material accumulates under the chain during rotation, the effective diameter of the chain can be increased such that the teeth of the sprockets do not engage every link in the chain as the chain is driven by the sprockets. Such an occurrence of the chain skipping one or more teeth of the sprockets is referred to as "chain jumping," and has been found to significantly reduce the durability of the chain.

What is needed in the art is a feeder that is less prone to adverse effects caused by material and debris wrapping, impacting, and/or accumulating on the sprockets, the shaft rotating the sprockets, and/or the chain being rotated by the sprockets.

SUMMARY OF THE INVENTION

The present invention provides a shield assembly at least partially covering a sprocket and including an interior groove defining an enclosed interior space through which teeth of the sprocket rotate during a full rotation of the sprocket.

The invention in one form is directed to an assembly for rotating a chain including: a shaft; a sprocket rotatably mounted on the shaft and including a plurality of teeth configured to engage the chain; and a shield assembly covering at least a portion of the sprocket. The assembly is characterized in that the shield assembly has an interior groove formed therein defining an enclosed interior space, each of the teeth of the sprocket rotating through the enclosed interior space during a full rotation of the sprocket. The invention is also directed to an agricultural feeder including one or more such assemblies for rotating a chain.

An advantage of the present invention is that the sprocket, except for some of the circumference and teeth, can be completely covered by the shield assembly to prevent material wrapping around the sprocket and shaft rotating the sprocket.

Another advantage is that the shield assembly can have a formed labyrinth to prevent intrusion of debris into the shield assembly.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
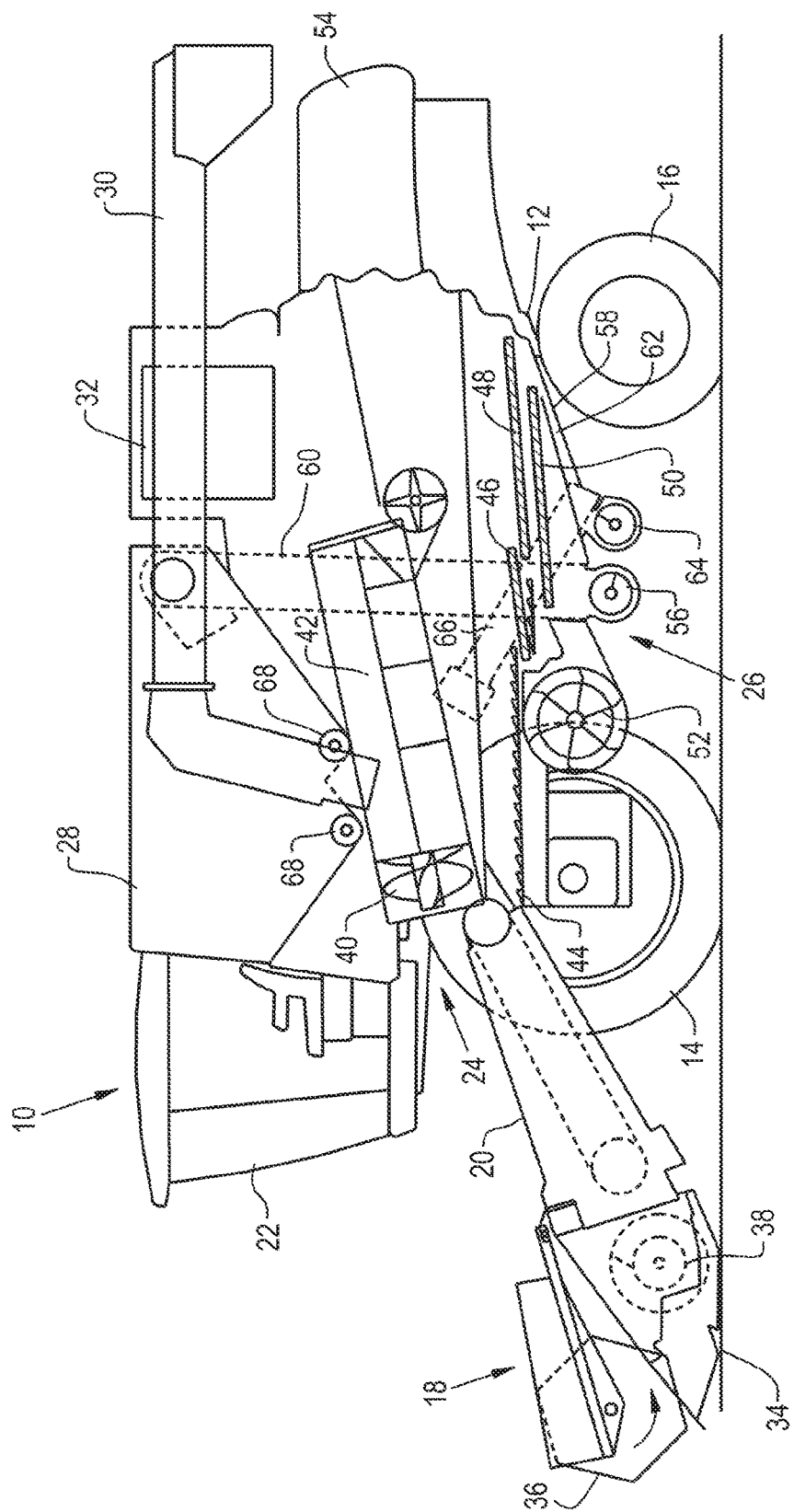
FIG. 1 is a side view of an embodiment of an agricultural harvester in the form of a combine.

Referring now to the drawings, and more particularly to FIG. 1, there is shown an agricultural harvester in the form of a combine 10, which generally includes a chassis 12, ground engaging wheels 14 and 16, a header 18, a feeder 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder 20. Feeder 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

Figure 2:
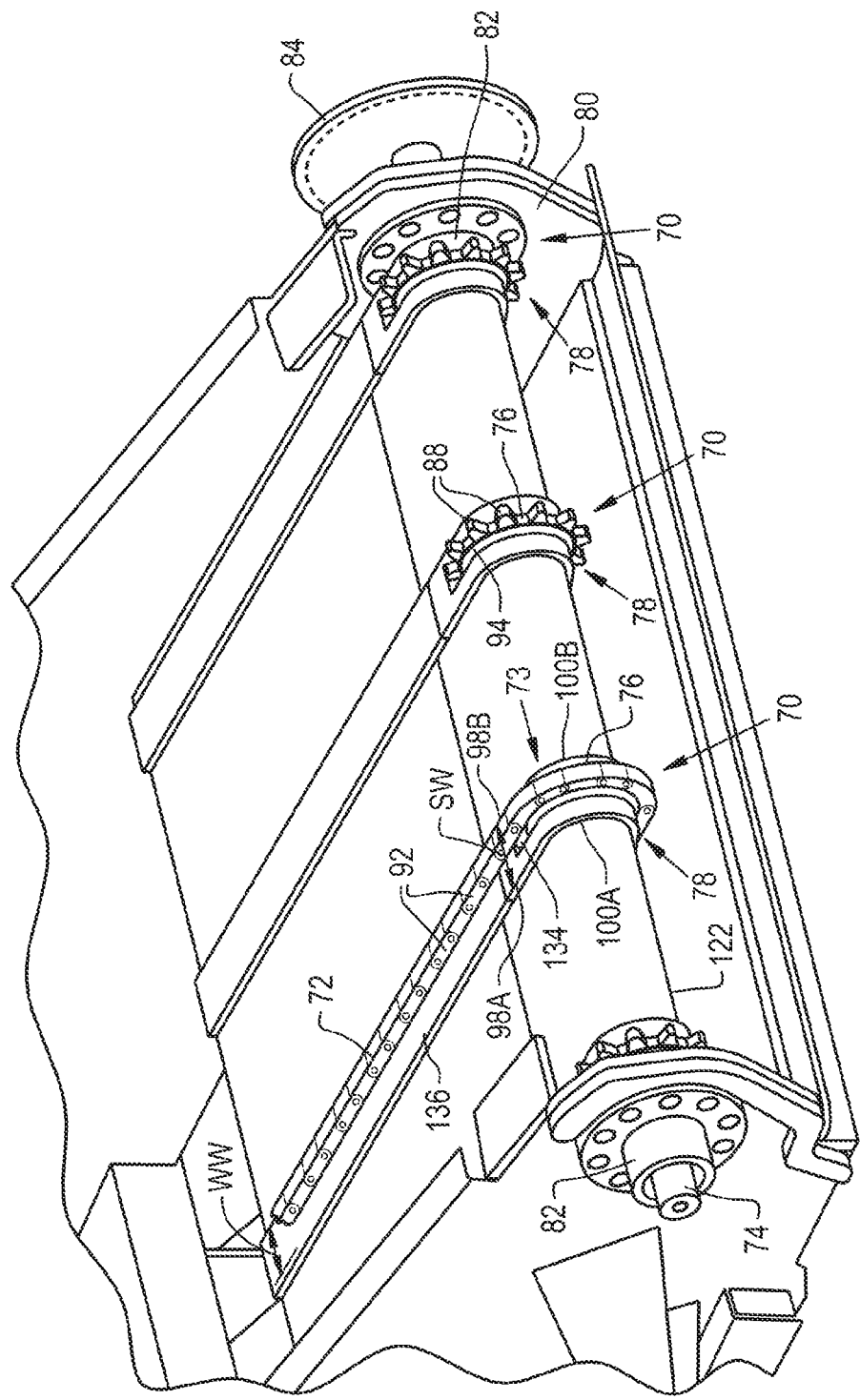
FIG. 2 is a perspective view of an embodiment of a feeder according to the present invention.

According to an aspect of the present invention, and referring now to FIG. 2, the feeder 20 includes an assembly 70, for rotating a chain 72, which includes a shaft 74, a sprocket 76 rotatably mounted on the shaft 74, and a shield assembly 78 covering at least a portion of the sprocket 76. The assembly 70 and chain 72 can together be referred to as a conveyor 73. It should be appreciated that FIG. 2 illustrates a single shaft 74 driving multiple sprockets 76 at least partially covered by shield assemblies 78 and engaging chains 72, with such a system defining multiple assemblies 70 for rotating chains 72. For ease of description, only one such assembly 70 is described herein unless otherwise stated, but all of the assemblies 70 can be configured similarly or identically. As can be seen, the shaft 74 is rotatably mounted to a frame 80 of the feeder 20 using bearings 82 and can be rotated by connection to a driven gear 84. The shaft 74 can also be rotated by the chain 72 engaging the sprocket 76, with the chain 72 being rotated by a different sprocket or other element.

Figure 3:
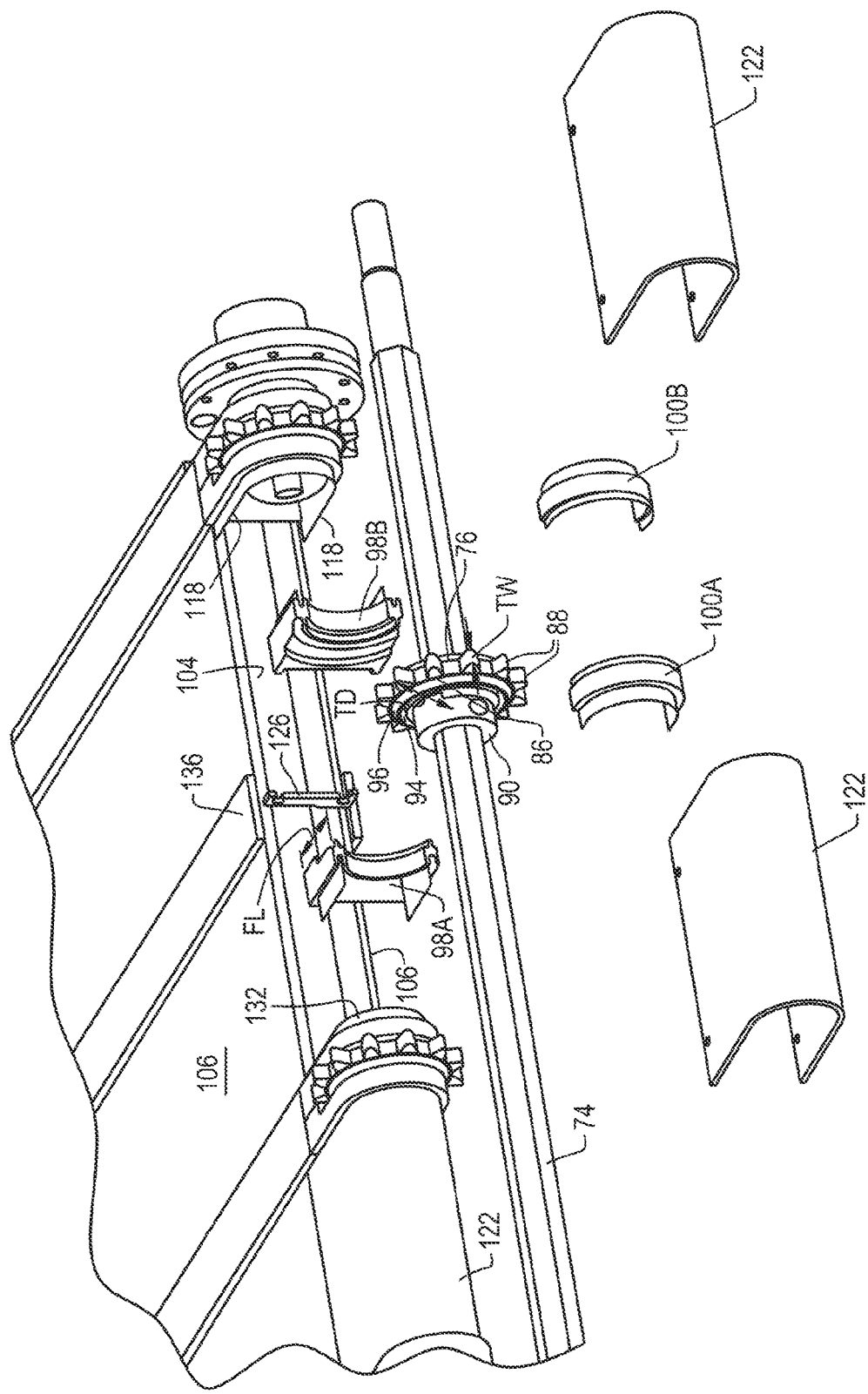
FIG. 3 is a partially exploded view of the feeder shown in FIG. 2.

Referring now to FIGS. 2-3, the sprocket 76 can include an annular main sprocket body 86 with multiple radially extending teeth 88 connected to the circumference of the sprocket body 86 and a sprocket hub 90 extending transversely from one or both faces of the sprocket body 86. The sprocket body 86 and sprocket hub 90 have a bore formed therethrough that passes over the shaft 74. The bore is shaped to engage the shaft 74 so rotation of the shaft 74 also causes rotation of the sprocket 76, or vice versa, such that the shaft 74 defines an axis of rotation of the sprocket 76. As shown, the teeth 88 of the sprocket 76 are spaced about the circumference of the sprocket body 86 so each tooth 88 engages one link 92 of the chain 72 during rotation of the sprocket 76, with the number and placement of teeth 88 on the sprocket 76 being chosen to engage each link 92 of the chain 72 as the sprocket 76 rotates and the links 92 rotate about the sprocket 76. Engaging each link 92 of the chain 72 with a tooth 88 of the sprocket 76 as the sprocket 76 and chain 72 rotate allows for smooth operation of the chain 72 and any conveying elements that might be connected to the chain 72, such as slats or paddles. It should be appreciated, however, that each tooth 88 does not need to engage a link 92 of the chain 72 during rotation, such as in the case of a double pitch conveyor chain where only one out of two teeth engage a chain. Further, the shape and layout of the teeth 88 of the sprocket 76 can be adjusted to engage elements other than links 92 of a chain 72, such as the teeth of a toothed belt. The sprocket body 86 can also include a groove 94 formed in a labyrinth ring 96 on each face of the sprocket body 86, the significance of which will be described further herein.

Still referring to FIGS. 2-3, it can be seen that the shield assembly 78 can cover almost an entirety of the sprocket 76, except for some of the teeth 88 and circumference of the sprocket 76 which are exposed and engaging the chain 72. The shape of the shield assembly 78, as shown, allows all of the teeth 88 of the sprocket 76 to rotate through the shield assembly 78 during a full 360 degree rotation of the sprocket 76 while also preventing ingress of material into the shield assembly 78 and preventing the chain 72 from rotating within the shield assembly 78. The shield assembly 78 can include, for example, a guide portion 97 (shown in FIG. 5) that takes the chain 72 off the sprocket 76 before the teeth 88 of the sprocket 76 enter the shield assembly 78 to prevent the chain 72 from entering the shield assembly 78.

Figure 4:
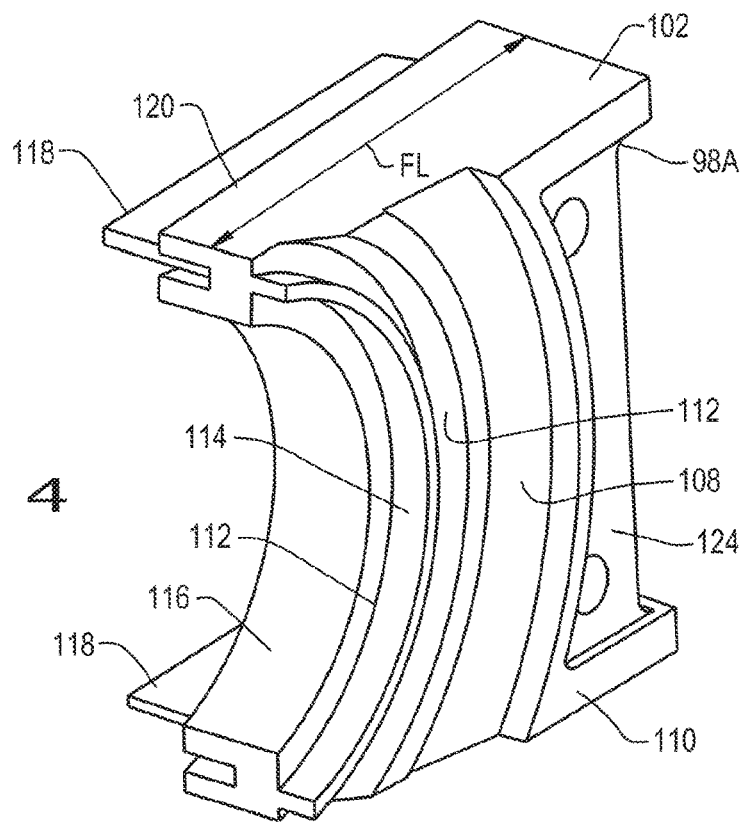
FIG. 4 is a perspective view of an embodiment of a component of a shield assembly formed according to the present invention.
Figure 5:
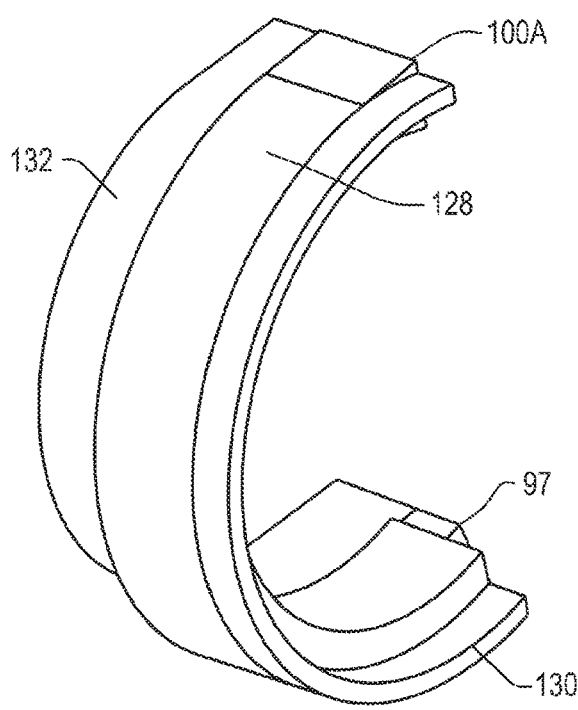
FIG. 5 is a perspective view of an embodiment of another component of a shield assembly formed according to the present invention.

The shield assembly 78 can be formed as two or more separable components. As shown in FIGS. 3-5, the shield assembly 78 can include four components: a front left component 98A, a front right component 98B, a rear left component 100A, and a rear right component 100B. It should be appreciated that the terms "front," "rear," "right," and "left" are used to designate relative positions of the components 98A, 98B, 100A, 100B in the context of FIGS. 2-3, and should not be interpreted as limiting any particular orientation of the components 98A, 98B, 100A, 100B. As can be seen in FIGS. 3-5, the front left component 98A and rear right component 98B can be constructed identically and the rear left component 100A and rear right component 100B can also be constructed identically, with the front right component 98B being flipped relative to the orientation of the front left component 98A and the rear right component 100B being flipped relative to the orientation of rear left component 100A. The shield assembly 78 can also be formed as fewer or more than four components, if desired. The front left component 98A and rear left component 100A can be mounted on and cover the sprocket hub 90 and the front right component 98B and rear right component 100B can be placed on the opposite side of the sprocket 76, with the components 98A, 98B, 100A, 100B collectively covering almost an entirety of the sprocket 76. Since the shield assembly 78 is at least partly covering and likely in contact with the sprocket 76, it is useful if the shield assembly 78 is formed of a low friction polymer material, such as polyethylene, to reduce sliding friction between the shield assembly 78 and rotating sprocket 76, as well as reduce the chance of a fire being started by friction between the shield assembly 78 and the sprocket 76, which can be formed of a metal material.

Referring now to FIG. 4, an embodiment of the front component 98A, 98B is shown. For ease of description in describing the front components 98A, 98B, only the construction of the front left component 98A is described in-depth, but as previously described the front components 98A and 98B can be constructed identically. The front component 98A can have a front base 102 with a generally rectangular cross-section that abuts against a wall 104 formed and enclosing the space between two surfaces 106 of the feeder frame 80. A circular teeth groove 108 is formed into a lateral surface 110 of the front base 102. When the two front components 98A and 98B are both mounted into the frame 80 by a press fit or using hardware such as bolts, nuts, or rivets, as shown in FIG. 2, the circular teeth grooves 108 of the front components 98A, 98B together form an interior groove in the shield assembly 78 which defines an enclosed interior space that allows rotation of the teeth 88 of the sprocket 76 therethrough during a full rotation of the sprocket 76. By having the interior groove formed in the shield assembly 78, the shield assembly 78 can cover an entirety of the sprocket 76, except for the teeth 88 and circumference of the sprocket 76 that are not within the enclosed interior space defined by the interior groove, to reduce the chance of material or debris interfering with rotation of the chain 72. Each teeth groove 108 can be formed into the front base 102 so the teeth grooves 108 together form an interior groove having a groove width that is at least equal to a tooth width TW of the teeth 88 of the sprocket 76, with it being useful to make the groove width as close as possible to the tooth width TW of the teeth 88 to minimize the amount of space between the shield assembly 78 and sprocket 76 that will allow ingress of material. For example, the groove width may be no more than 1 cm greater than the tooth width TW of the teeth 88. Similarly, the circular teeth grooves 108 can be formed into the front base 102 with a groove diameter which is at least equal to a tooth diameter TD of the teeth 88 of the sprocket 76. For example, the groove diameter may be no more than 1 cm greater than the tooth diameter TD.

The front component 98A can also have front labyrinth grooves 112 formed in the front base 102 to form a front labyrinth rib 114 therebetween. The front labyrinth grooves 112 can be shaped such that the labyrinth ring 96 of the sprocket 76 tightly fits within and the front labyrinth rib 114 tightly fits within the groove 94 of the sprocket 76. Since the sprocket 76, and thus the groove 94 and labyrinth ring 96, will be rotating with the shaft 74, forming the front component 98A of a low friction material can reduce the friction that occurs between the labyrinth ring 96 and the front labyrinth groove 110 and between the front labyrinth rib 114 and groove 94 during rotation of the sprocket 76, if the labyrinth ring 96 tightly fits within the front labyrinth groove 110 and the front labyrinth rib 114 tightly fits within the groove 94. Alternatively or in addition, a lubricant can also be provided in the front labyrinth groove 110 and groove 94 to reduce the sliding friction between the front labyrinth groove 110 and the labyrinth ring 96 and between the front labyrinth rib 114 and the groove 94. As can be seen in FIG. 4, the front labyrinth grooves 112 can be formed into a greater depth of the lateral surface 110 of the front base 102 than the teeth groove 108, corresponding to the groove 94 and labyrinth ring 96 of the sprocket 76 being formed on one or more of the faces of the sprocket 76, rather than the circumference of the sprocket 76. The front base 102 can also have a circular front bearing bore 116 formed therein that can be mounted to the sprocket hub 90. Further, the front component 98A can have one or more shield ribs 118 projecting from a lateral surface 120 that is opposite the lateral surface 110 to support a curved shield 122 in conjunction with shield ribs 118 of an adjacent front component 98B, as can be seen in FIGS. 2-3. The curved shield 122 can abut against the wall 104 formed between the two surfaces 106 of the frame 80 and have a lateral end supported by the shield ribs 118 to enclose space formed between the surfaces 106 and the wall 104, along with the shield assemblies 78, and prevent material ingress into the space between the wall 104 and surfaces 106. The front base 102 can also have a mounting groove 124 formed in the lateral surface 110 to allow the front base 102 to be mounted to a bracket 126 placed within the space 104 between the two surfaces 106. It should therefore be appreciated from FIGS. 2-4 that the front components 98A and 98B can substantially cover the front of the sprocket 76, except for the teeth 88 and circumference of the sprocket 76 which are outside the enclosed interior space of the shield assembly 78, to shield the shaft 74 and sprocket 76 from material and debris. As such, the front component 98A can have a front component length FL, from front to back, that is approximately equal to half of the front-to-back length of the sprocket 76, which will correspond to the radius of a circular sprocket 76.

Referring now to FIG. 5, an embodiment of the rear component 100A, 100B is shown. For ease of description in describing the rear components 100A, 100B, only the construction of the rear left component 100A is described in-depth, but as previously described the rear components 100A and 100B can be constructed identically. As shown, the rear component 100A can have a substantially half-ring shaped rear base 128 that will abut against the back of the front component 98A and be defined about a rear base radius. The rear base radius of the rear base 128 can be, for example, approximately equal to the radius of the sprocket 76, with the half-ring shape of the rear base 128 defining an arc length about the rear base radius that is approximately equal to half the circumference of the sprocket 76. A rear labyrinth rib 130 can be connected to the rear base 128 and define a labyrinth rib radius which is greater than the rear base radius, to allow the rear labyrinth rib 130 to slide over the labyrinth ring 96 of the sprocket 76 and have the labyrinth ring 96 abut against the rear base 128. Unlike the front labyrinth rib 114 of the front component 98A that is placed in the groove 94 of the sprocket 76, the rear labyrinth rib 130 of the rear component 100A can be placed over the labyrinth ring 96 to cover the labyrinth ring 96. In this sense, a wall of the front labyrinth groove 112 and the front labyrinth rib 114 of the front component 98A can cover the labyrinth ring 96 while the rear labyrinth rib 130 of the rear component 100A can cover the labyrinth ring 96, with the front component 98A and rear component 100A together forming a labyrinth to prevent material or debris ingressing into the shield assembly 78. The rear component 100A can also have a shield rib 132 on a side of the rear base 128 opposite the rear labyrinth rib 130 to support a lateral end of a curved shield 122, similar to the shield ribs 118 of the front component 98A.

Referring again to FIG. 2, it can be seen that when the front components 98A, 98B and rear components 100A, 100B are positioned to cover portions of the sprocket 76 and the curved shields 122 are positioned between the assemblies 70, the teeth 88 and circumference of the sprocket 76 outside the enclosed interior space of the shield assembly 78 can be the only exposed portion of the sprocket 76 that can be contacted by the chain 72 and material, while the shaft 74 is completely shielded. By having the teeth 88 of the sprocket 76 rotate through the enclosed interior space of the shield assembly 78, the shield assembly 78 can enclose all of the sprocket 76 that does not engage the chain 72, while also enclosing the teeth 88 of the sprocket 76 rotating through the enclosed interior space. Some of the teeth 88 and circumference of the sprocket 76 can be exposed out of the shield assembly 78 through a teeth opening 134 formed in the shield assembly 78 as the sprocket 76 rotates, before rotating into the enclosed interior space of the shield assembly 78 and being covered by the shield assembly 78. The teeth opening 134 can be, for example, formed at the abutment of the front components 98A and 98B at the end of the teeth grooves 108 formed in the front components 98A and 98B. The rear labyrinth ribs 130 of the rear components 100A and 100B can abut their respective front components 98A and 98B adjacent to the formed teeth opening 134 to minimize possible ingress of material into the shield assembly 78.

To increase the effective life of the chain 72, the feeder 20 can include one or more wear strips 136 placed on the two surfaces 106 of the frame 80 that are formed of a low-friction material, with the chain 72 moving across the wear strips 136 during rotation of the shaft 74 and sprocket 76. The wear strip 136 can a wear strip width WW which is aligned with and equal to a shield assembly width SW of the shield assembly 78, as can be seen in FIG. 2, with the front components 98A and 98B of the shield assembly 78 having top surfaces aligned with the top surface of the wear strip 136. If desired, the wear strip 136 can extend from a front of the surface 106 to the shield assembly 78. The materials forming the wear strip(s) 136 can be low friction polymers such as polyethylene or other suitable materials that will not cause damage to the chain 72 or create sufficient heat to cause a fire as the chain 72 slides along the strip 136.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An assembly for rotating a chain or toothed belt, comprising:
    a shaft;
    a sprocket rotatably mounted on the shaft, the sprocket including a plurality of teeth configured to engage the chain or toothed belt; and
    a shield assembly covering at least a portion of the sprocket,
    wherein the shield assembly comprises an interior groove formed therein defining an enclosed interior space, wherein each of the plurality of teeth of the sprocket is configured for rotating through the enclosed interior space during a full rotation of the sprocket, and wherein the shield assembly covers an entirety of the sprocket except for at least a portion of the plurality of teeth.

2. The assembly of claim 1, wherein the shield assembly further comprises a guide portion.

3. The assembly of claim 1, wherein the interior groove has a groove width which is no more than 1 cm greater than a tooth width (TW) of the plurality of teeth.

4. The assembly of claim 3, wherein the interior groove defines a groove diameter which is no more than 1 cm greater than a tooth diameter (TD) of the plurality of teeth.

5. The assembly of claim 1, wherein the sprocket further comprises a labyrinth ring, and wherein the shield assembly further comprises at least one groove formed therein which covers the labyrinth ring.

6. The assembly of claim 1, wherein the shield assembly further comprises a teeth opening through which the plurality of teeth of the sprocket are configured to rotate.

7. The assembly of claim 1, wherein the sprocket further comprises a labyrinth groove, and wherein the shield assembly further comprises at least one labyrinth rib that fits within the labyrinth groove.

8. The assembly of claim 1, wherein the shield assembly surrounds a hub of the sprocket.

9. The assembly of claim 1, wherein the shield assembly further comprises at least two separable parts.

10. The assembly of claim 1, wherein the shield assembly covers an entirety of the sprocket except for at least a portion of the plurality of teeth and a portion of a circumference of the sprocket that are outside of the enclosed interior space.

11. A conveyor for conveying agricultural material comprising:
at least one assembly for rotating a chain or toothed belt, the at least one assembly comprising:
a shaft:
a sprocket rotatably mounted on the shaft, the sprocket including a plurality of teeth configured to engage the chain or toothed belt and
a shield assembly covering at least a portion of the sprocket,
wherein the shield assembly comprises an interior groove formed therein defining an enclosed interior space,
wherein each of the plurality of teeth of the sprocket is configured for rotating through the enclosed interior space during a full rotation of the sprocket, and
wherein the shield assembly covers an entirety of the sprocket except for at least a portion of the plurality of teeth.

12. The conveyor of claim 11, further comprising at least a second assembly for rotating a second chain or toothed belt, the second assembly comprising:

a second sprocket rotatably mounted on the shaft, the second sprocket including a second plurality of teeth configured to engage the second chain or toothed belt and a second shield assembly covering at least a portion of the second sprocket, wherein the second shield assembly comprises a second interior groove formed therein defining a second enclosed interior space, wherein each of the second plurality of teeth of the second sprocket is configured for rotating through the second enclosed interior space during a full rotation of the second sprocket, and wherein the second shield assembly covers an entirety of the second sprocket except for at least a portion of the second plurality of teeth.

13. The conveyor of claim 12, further comprising a material shield for covering part of the shaft, the material shield being placed between and supported by the at least one assembly and the at least second assembly for rotating the chains or toothed belts.

14. The conveyor of claim 11, further comprising a feeder frame supporting the shield assembly and a wear strip placed on a surface of the feeder frame, the wear strip having a wear strip width (WW) that is aligned with and equal to a shield assembly width (SW) of the shield assembly, the wear strip comprising a low friction material.

15. A combine harvester comprising:
a header;
a feeder; and
a threshing and separating system,
wherein the feeder comprises:
a conveyor for conveying agricultural material comprising:
at least one assembly for rotating a chain or toothed belt, the at least one assembly comprising:
a shaft;
a sprocket rotatably mounted on the shaft, the sprocket including a plurality of teeth configured to engage the chain or toothed belt; and
a shield assembly covering at least a portion of the sprocket,
wherein the shield assembly comprises an interior groove formed therein defining an enclosed interior space,
wherein each of the plurality of teeth of the sprocket is configured for rotating through the enclosed interior space during a full rotation of the sprocket, and
wherein the shield assembly covers an entirety of the sprocket except for at least a portion of the plurality of teeth.

* * * * *